United States Patent [19]
Dearman

[11] 3,944,202
[45] Mar. 16, 1976

[54] CLAMPING DEVICE FOR USE IN MAKING MITERED JOINTS IN PIPE SECTIONS

[76] Inventor: Timothy C. Dearman, 4191 E. Stanley Road, Mount Morris, Mich. 48458

[22] Filed: Aug. 19, 1974

[21] Appl. No.: 498,590

[52] U.S. Cl. .................. 269/130; 29/200 P; 228/49
[51] Int. Cl.² .......................................... B23K 1/14
[58] Field of Search ............ 269/41, 131; 29/200 P, 29/272; 228/44, 49; 248/70, 229, 231; 285/21, 22, 286

[56] References Cited
UNITED STATES PATENTS

| | | | |
|---|---|---|---|
| 552,951 | 1/1896 | Bower et al............................ | 248/70 |
| 2,663,531 | 12/1953 | Rubano................................ | 248/231 |
| 3,467,295 | 9/1969 | Watson................................. | 228/49 |
| 3,653,574 | 4/1972 | Dearman............................. | 29/200 J |
| 3,666,159 | 5/1972 | Watson................................ | 29/200 P |
| 3,733,706 | 5/1973 | Blohm................................. | 248/231 |

*Primary Examiner*—Al Lawrence Smith
*Assistant Examiner*—Robert C. Watson
*Attorney, Agent, or Firm*—Learman & McCulloch

[57] ABSTRACT

A clamping assembly particularly useful for aligning abutting ends of pipe sections to form a mitered joint. A plurality of individual clamp assemblies are clamped in circumferentially spaced positions upon one pipe section by a circumferentially extending chain, each clamp assembly having an elongate jack arm which can be clamped in selected positions of circumferential and axial adjustment upon the one pipe section so that the jack arms may be projected to different axial distances from the chain into operative engagement with a second pipe section lying in a plane inclined to axis of the one pipe section.

5 Claims, 4 Drawing Figures

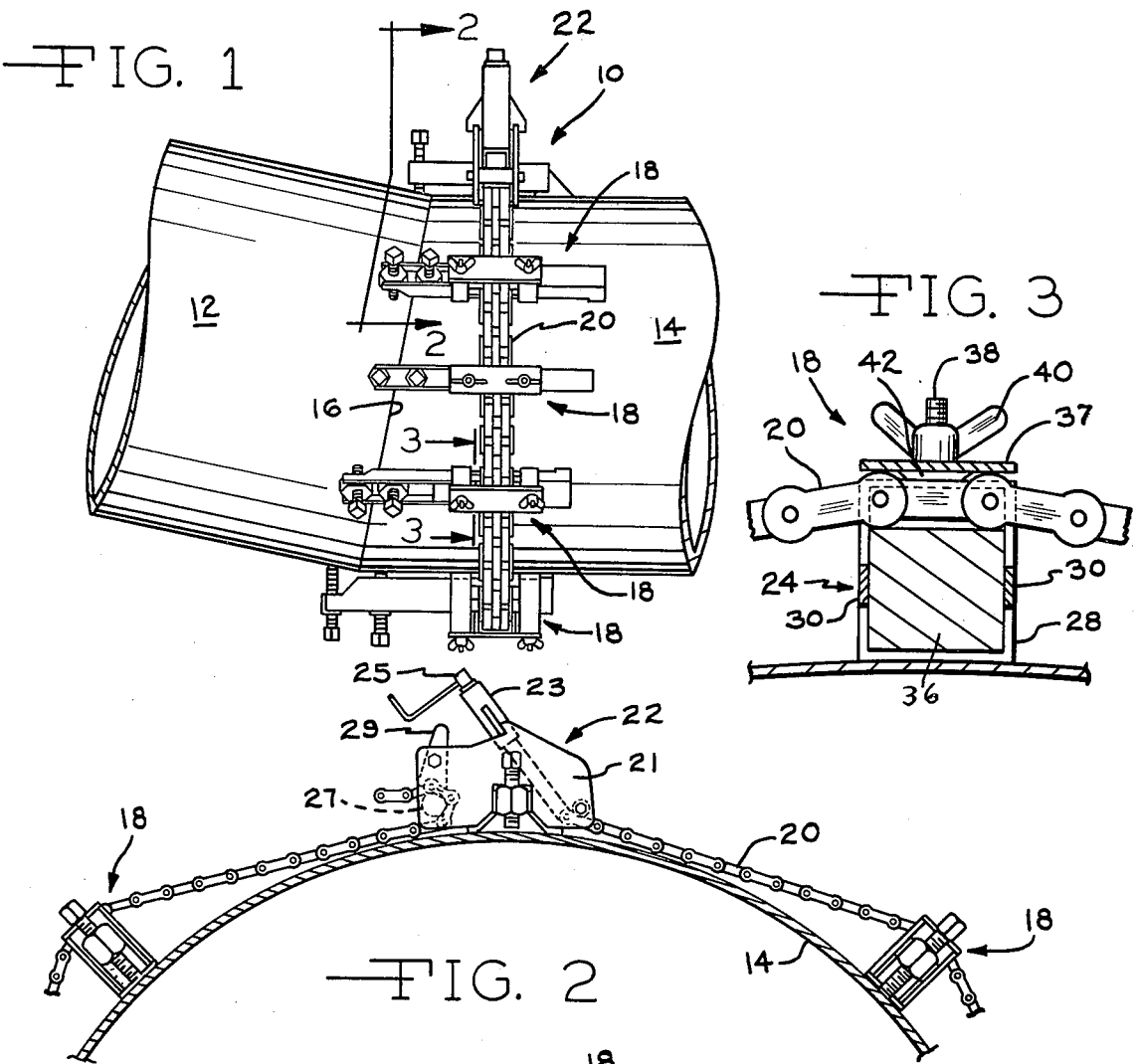
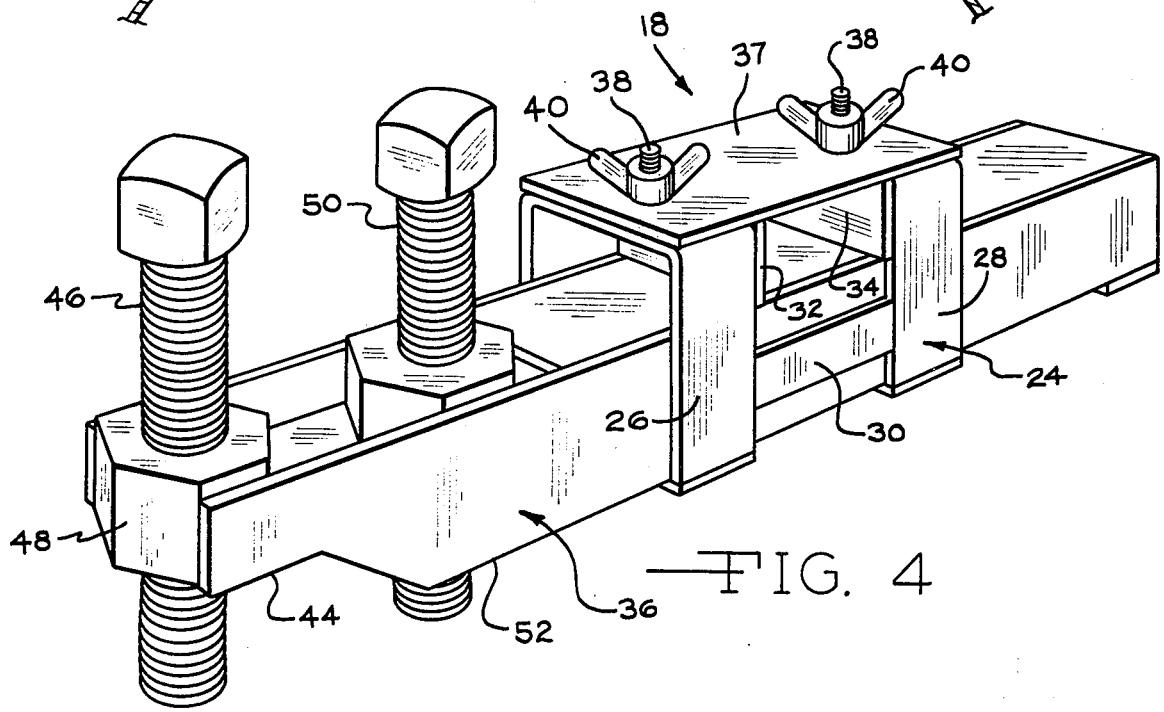

CLAMPING DEVICE FOR USE IN MAKING MITERED JOINTS IN PIPE SECTIONS

BACKGROUND OF THE INVENTION

In the assembly of pipelines from individual pipe lengths it is customary to weld the pipe lengths to each other at a butt joint in the field. To hold the abutting pipe sections in position during the welding operation, a plurality of individual clamping devices are clamped in position near one end of one pipe length by a circumferentially extending chain which, when tightened, presses the clamping devices firmly against the pipe. Each clamping device projects beyond the end of the pipe section to which it is clamped and jack screws on the clamping device are adjusted to grip the end of the adjacent pipe length to hold it in aligned abutting relationship with the first pipe length while the joint is welded. Typical examples of clamping devices of this type are shown in U.S. Pat. Nos. 3,593,402; 3,666,159; and 3,704,503.

Most clamping devices of this general type presently in use perform adequately for the formation of joints where the abutting pipe ends lie in general planes perpendicular to the pipe axis, i.e., where the assembled pipe string runs in a straight line. However, problems are encountered by prior art devices in those cases where a mitered joint must be formed, that is, where the two pipe lengths form an angled joint with the axes of two adjacent lengths inclined to one another.

The problem encountered in prior art clamping devices where a mitered joint is to be formed arises due to the fact that most prior art devices rely on the clamping force exerted by the circumferentially extending chain to anchor the device to one of the pipe lengths and rely on the jack screw to anchor the device to the other of the two lengths. Where a mitered or angled joint is to be formed, the axial distance between the points of application of the clamping forces on the respective pipe sections will vary considerably around the circumference of the joint due to the fact that the clamping chain lies in a plane substantially normal to the axis of one of the pipe lengths while the abutting joint lies in a plane which is inclined to the axis of at least one of the two pipe sections. Application of the clamping force as close as possible to the joint is desired, because in many instances the clamping device must not only establish the desired axial relationship between the two pipe sections, but must also be utilized to correct an out-of-round condition of at least one pipe length so as to form an abutting joint around the entire circumference.

The present invention is especially directed to a pipe clamping assembly of the general type discussed above which is useful not only in coaxially aligning abutting pipe lengths, but which is also especially useful in aligning abutting pipe lengths where the abutting joint may lie in a plane inclined to the axis of one or both of the pipe lengths.

SUMMARY OF THE INVENTION

In a clamping device according to the present invention, each of a plurality of individual clamping assemblies includes a housing member and an elongate jack arm which is received for longitudinal sliding movement within the housing assembly. The housing member is formed with an opening through which a flexible clamping chain can be passed transversely through the housing at the outer side (side remote from the pipe) of the jack arm. The width of the opening in the housing through which the chain is passed only slightly exceeds the width of the chain so that, although the housing can be shifted longitudinally along the chain to a selected circumferential position upon a pipe, the housing is held against movement relative to the chain in a direction transverse to the chain.

In its passage through the opening in the housing, the chain rests upon the outer side of the jack arm. The jack arm is slidable within the housing longitudinally of the arm and axially of the pipe. Tensioning of the chain thus forces the clamping arm inwardly toward the pipe, the clamping arm bearing against an inner underlying wall surface of the housing so that clamping of the chain clamps both the arm and housing in a fixed position relative to one of the pipe lengths. The clamping arms are adjusted individually axially relative to the pipe section upon which they are clamped so that the end of the arm projects beyond the joint to be formed. Two jack screws are mounted in longitudinally spaced relationship at the end of each arm, and the arm is positioned so that one of the pair of screws is positioned on each side of the joint to be formed. A clamping plate mounted on the housing is employed to lock the housing in position longitudinally of the chain to enable the individual clamping devices to be held in circumferentially fixed position while the arm length and jack screws are being adjusted.

Other objects and features of the invention will become apparent by reference to the following specification and the drawings.

IN THE DRAWINGS

FIG. 1 is a side elevational view showing the clamp assembly of the present invention maintaining two abutting pipe sections in alignment with each other during the formation of a mitered joint;

FIG. 2 is a detailed cross sectional view taken approximately on line 2—2 of FIG. 1;

FIG. 3 is a detailed cross sectional view taken approximately on the line 3—3 of FIG. 1; and FIG. 4 is a perspective view of an individual clamp assembly.

FIG. 1 discloses a clamping device according to the present invention, and designated generally by the reference character 10, holding two pipe lengths 12 and 14 in the desired alignment with each other to form an abutted miter joint 16. In the particular joint shown in the drawing, the abutted end of pipe 12 is normal to the axis of pipe 12 and the miter angle is formed entirely by the inclined abutted end of the pipe 14. This technique is frequently employed because it involves forming an angled end on only one of the two abutted pipe sections.

The clamping device 10 consists of a plurality of individual clamp assemblies designated generally 18, a flexible chain 20 which extends circumferentially of pipe length 14 and passes through each of the clamping assemblies 18, and a chain tightener designated generally 22 which is operable to tighten the circumferentially extending chain 20 to clamp the clamping assemblies 18 in position about the circumference of pipe section 14. For purposes of the present invention, chain tightener 22 may take the form of a known chain tightener commercially available from Dearman Manufacturing Products, Inc. of Flint, Michigan, and comprising a head 21 adapted to support a threaded sleeve 23 through which extends a threaded adjusting shaft 25 having a swivel connection to one end of the chain 20. The head 21 also includes a crossbar 27 around which the free end of the chain 20 may pass so as to enable any desired size loop to be formed by the chain. The chain is secured in a selected position relative to the bar 27 by means of a pivoted latch dog 29. Rotation of the shaft 25 in one direction or the other effects tightening or loosening of the chain about the pipe 14.

The construction of clamping assemblies 18 is best shown in FIGS. 3 and 4 of the drawings. Referring particularly to FIG. 4, each clamping assembly 18 includes a housing designated generally 24 which includes spaced apart, front and rear rectangular, open frames 26 and 28 fixedly interconnected to each other by side frame members 30. Front and rear cross plates 32 and 34 are welded in the illustrated positions on each of frames 26 and 28 to establish a passage through the housing which slidably receives and guides an elongate jack arm designated generally 36. The plates 32 and 34 also define a passage or opening through housing 24 which extends transversely above or at the outer side of arm 36 and is dimensioned to receive slidably chain 20.

A clamp plate 37 is mounted upon the top or upper side of front and rear frame members 28 and spans the space between the two members. Plate 37 is loosely received upon a pair of threaded studs 38 fixedly mounted upon frames 26 and 28, and wing nuts 40 are threadedly received on studs 38.

The thickness of chain 20 preferably equals or exceeds the vertical distance between the upper or outer side of jack arm 36 and the top of the frame members 26 and 28. The purpose of clamp plate 37 is to lock housing 24 at a selected position of longitudinal adjustment upon chain 20 so that the various clamp assemblies 18 will remain at the desired locations circumferentially of the pipe once they are located and clamped on the chain. To assist in this clamping operation, projecting lugs 42 are welded or formed on the underside of plate 37 to interlock with the links of chain 20 as is best shown in FIG. 3.

The spacing between cross plates 32 and 34 only slightly exceeds the width of chain 20. Hence when wing nuts 40 are tightened to urge plate 37 against the chain, housing 24 is effectively held against longitudinal and transverse movement relative to chain 20.

Jack arms 36 are of an elongate bar-like configuration and may be either of solid or built-up construction. The underside of the front end of arm 36 is cut away or relieved as at 44 (FIG. 4) to provide a greater range of vertical adjustment play for an outer jack screw 46 threadedly received in arm 36 as by a welded nut 48. A second jack screw 50 is threadedly received in arm 36 at a position spaced longitudinally inwardly from jack screw 46. The pipe engaging ends of the two jack screws project below the inner (with reference to the pipe sections) side 52 of arm 36.

Operation of the clamping assembly is believed apparent from FIG. 1 of the drawings. The desired number of clamping assemblies 18 are mounted upon chain 20 by passing the free end of the chain through each housing across the upper side of arm 36 and below clamp plate 37. Clamp plate 37 may be loosely tightened to lock the housing in position in the desired spacing along chain 20 and the clamp assemblies and chain are trained about one of the pipe lengths as shown in FIGS. 1 and 2. At this point, chain 20 is tightened to a degree just sufficient to hold all of the housings against pipe length 14. The jack arms 36 of each of the individual clamping assemblies then may be adjusted relative to their housings and axially of pipe 14 so that the screws 50 of each arm are closely adjacent the end of pipe 14 with the outer jack screws 46 located beyond the end of pipe section 14. Chain 20 is then snugly tightened to lock the clamping assemblies 18 in position and also to clamp the jack arms 36 of each assembly in their longitudinal or axially adjusted position. Pipe length 12 is then moved into position and the jack screws 46 and 50 are tightened to correct any out of roundness of the abutted pipe lengths and to hold the latter in position for the subsequent welding operation. Those parts of the frames 26 and 28 which bear on the pipe 14 form spaced apart seats for the jack bar to prevent its tilting as the jack screws are tightened.

Although only one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. Apparatus for clamping a pair of pipe lengths having confronting ends abutting one another and forming a joint therebetween, said apparatus comprising a flexible member forming a loop of such size as to encircle one of said pipe lengths adjacent its end; a plurality of housing members circumferentially spaced about said loop and encircled by said flexible member; an elongate jackbar slidably accommodated in each of said housing members for sliding adjustment transversely of said loop and being engaged by said flexible member, each of said jackbars being of such length as to enable one end thereof to extend beyond said joint and overlie the other of said pipe lengths; clamp means carried by said one end of each of said jackbars for clamping engagement with said other of said pipe lengths; and means for varying the size of said loop when said flexible member encircles said one pipe length whereby said flexible member selectively enables and disables adjustment of said housing members circumferentially of said loop and slidable adjustment of said jackbars relative to their housing members.

2. Apparatus according to claim 1 including lug means carried by each of said housing members and engageable with said flexible member for locking said housing members on said flexible member.

3. Apparatus according to claim 1 including a jack screw carried by each of said jackbars between said clamp means and said housing member.

4. Apparatus according to claim 3 wherein each of said jackbars has an undercut recess between said clamp means and said jack screw.

5. Apparatus according to claim 1 wherein each of said housing members comprises open rectangular front and rear frame members, side frame members fixedly receiving said front and rear members in spaced parallel relationship to each other to define a front to rear passage slidably receiving and guiding the associated jackbar, and cross plate members on the upper portions of said front and rear frame members defining the upper side of said passage, said cross plate members being spaced above said side frame members and spaced from each other by a distance greater than the width of said flexible member whereby opposite sides said flexible member receiving opening are defined said cross plate members and the underside of said opening is defined by the upper surface of said jackbar.

* * * * *

UNITED STATES PATENT AND TRADEMARK OFFICE
CERTIFICATE OF CORRECTION

PATENT NO. : 3,944,202
DATED : March 16, 1976
INVENTOR(S) : Timothy C. Dearman

It is certified that error appears in the above-identified patent and that said Letters Patent are hereby corrected as shown below:

Column 5, line 1, before "said" insert --of--.

Column 5, line 2, before "said" (first occurrence), insert --by--.

Signed and Sealed this eighteenth Day of May 1976

[SEAL]

Attest:

RUTH C. MASON
Attesting Officer

C. MARSHALL DANN
Commissioner of Patents and Trademarks